Patented Dec. 22, 1953

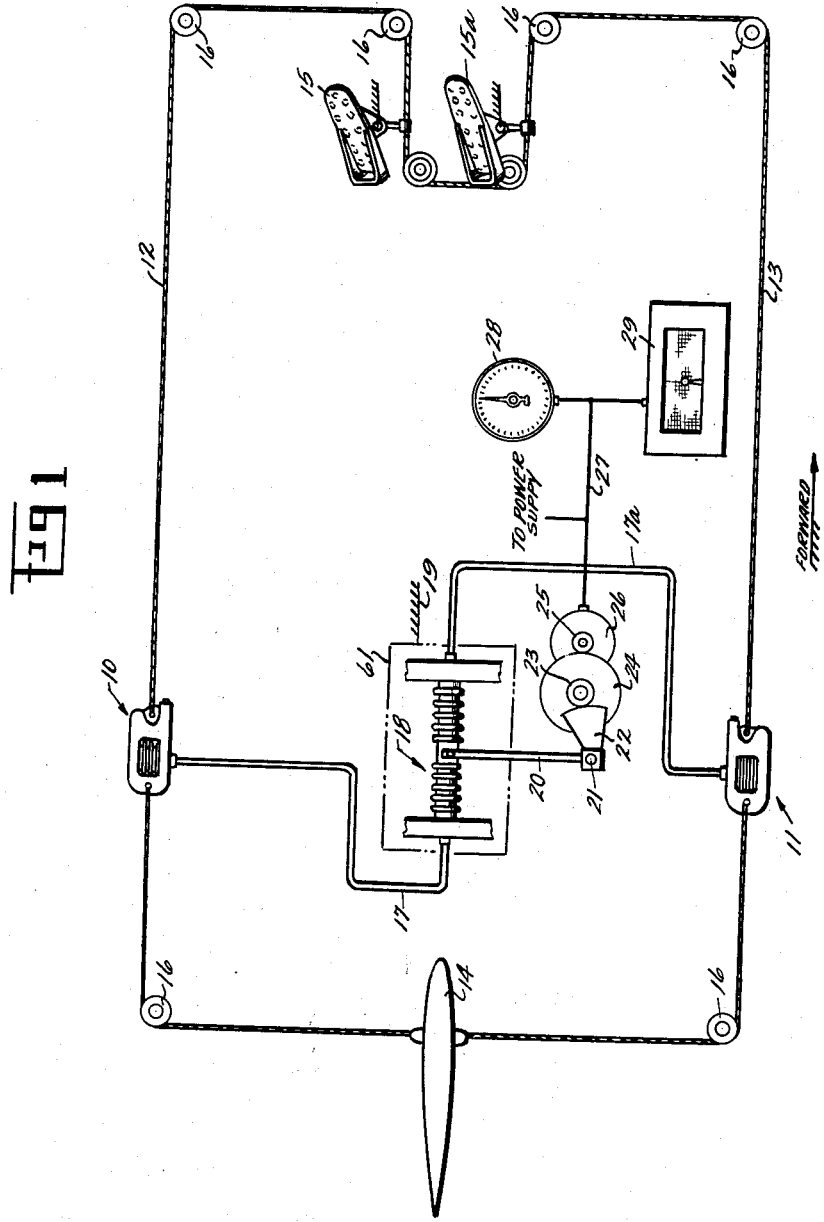

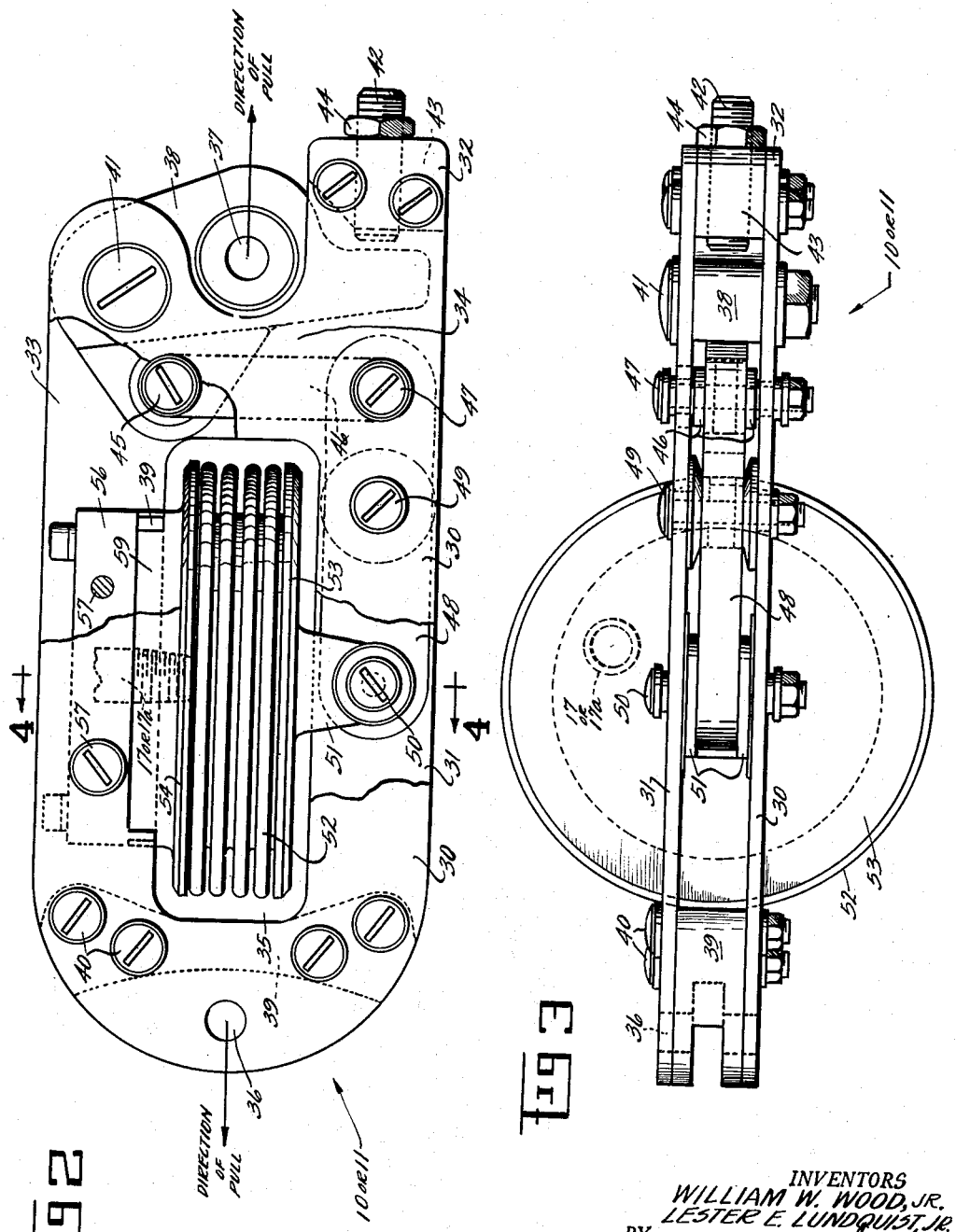

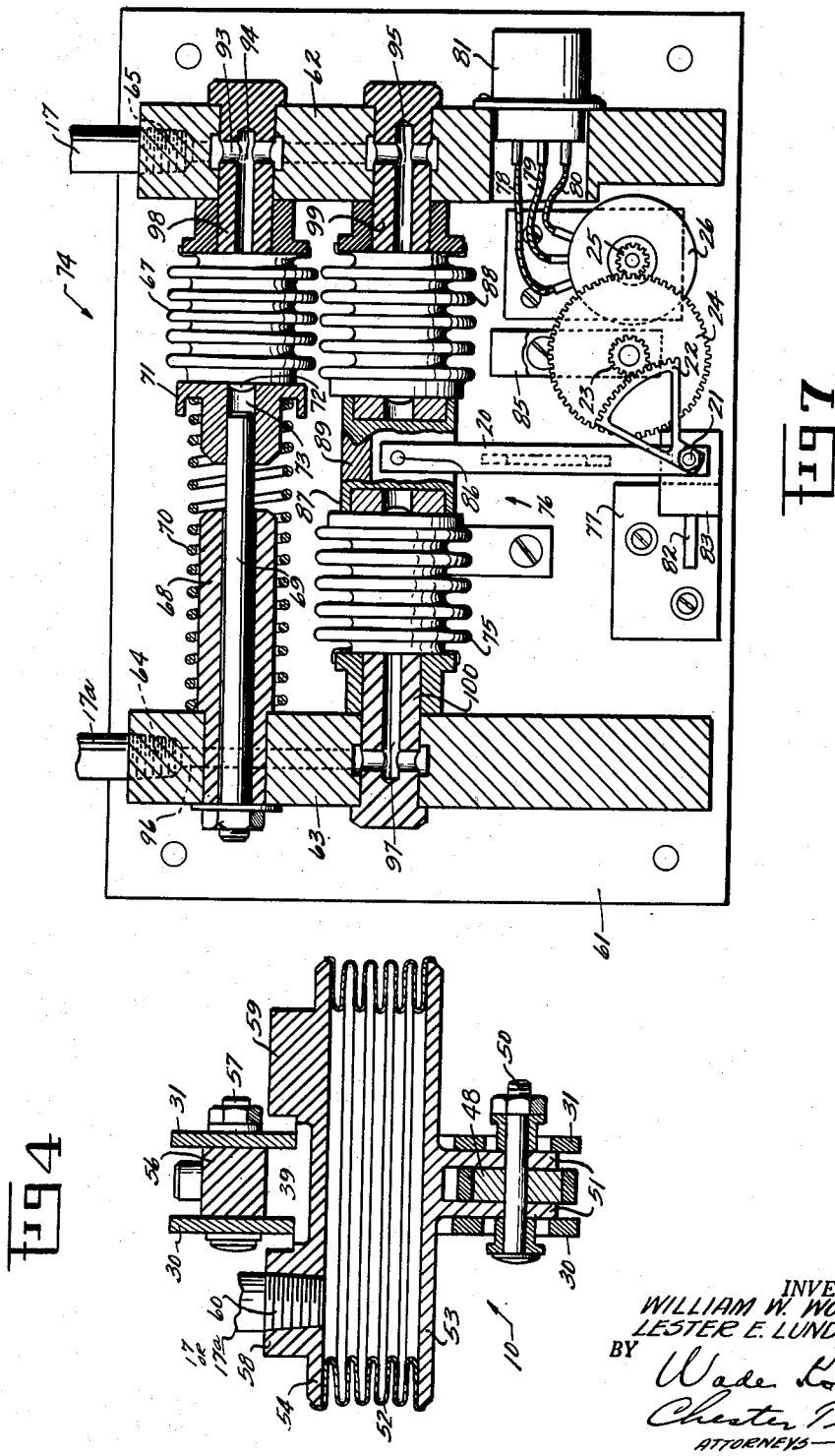

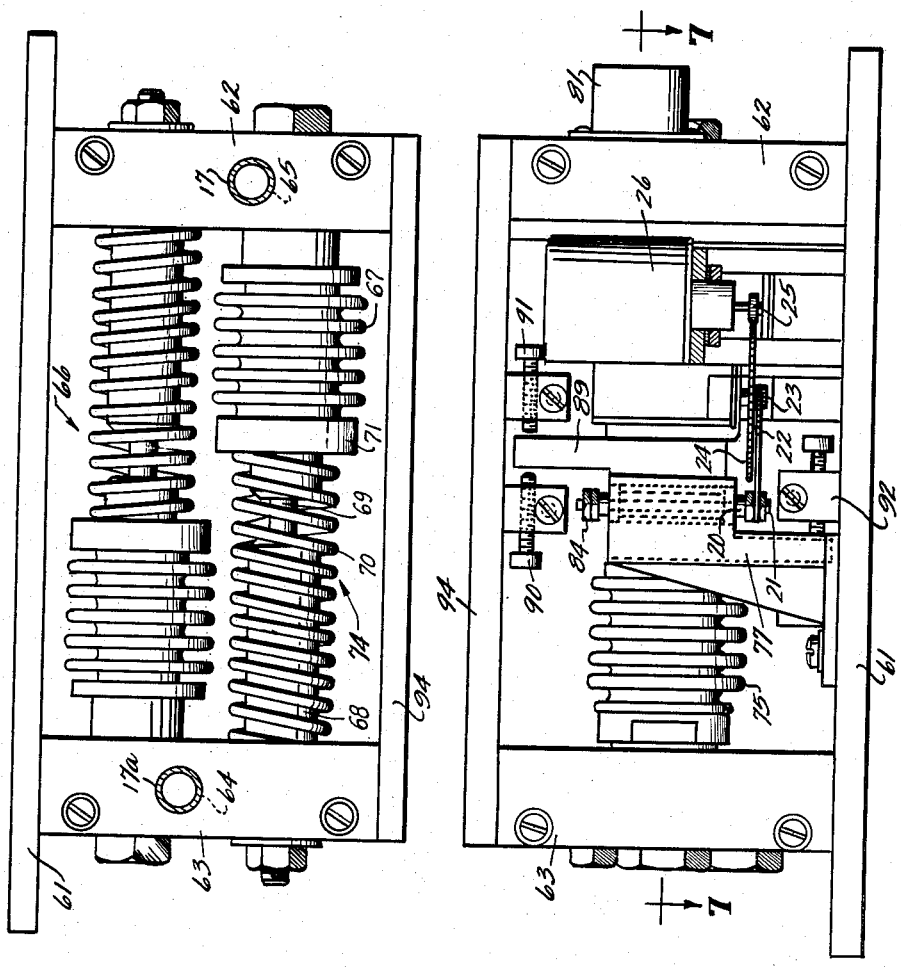

2,663,187

UNITED STATES PATENT OFFICE 2,663,187

SYSTEM FOR MEASURING AND RECORDING THE FORCES ACTING ON AIRPLANE CONTROLS AND THE LIKE

William W. Wood, Jr., Fenton, and Lester E. Lundquist, Jr., Binghamton, N. Y., assignors to the United States of America as represented by the Secretary of the Air Force Application December 26, 1950, Serial No. 202,614

5 Claims. (Cl. 73—143)

The invention described herein may be manufactured and used by or for the Government for governmental purposes without payment to us of any royalty thereon.

This invention relates to a system for measuring the forces acting upon cables or rods such as are attached to airplane controls and the like.

The principal object of this invention is to provide a system which will measure only the tensile force which the operator applies to the cable which is actuated, eliminating all other effects such as initial loads, temperature effects involving lengthening of the fuselage and the like.

One object of the invention is to provide an apparatus which will give an indication at a remote point of the amount of tension applied to a cable.

Another object is to provide a system for measuring the tension applied to control cables, which is small, light, convenient and which provides for the storage of excess displaced hydraulic fluid.

Another object is to provide a system of the class described in which the result may be under the continuous observation of an instructor at a point where the trainee is unable to observe it himself.

Other objects will be apparent to those skilled in the art upon reading the following specification.

The assembly of devices which this invention comprises is located as to its measuring or sensing elements in the cables or the rods which are attached to the element to be moved and which are in turn moved by or through some effort of the pilot or co-pilot in the navigation of the airplane. The sensing elements are in general tension-responsive force measuring devices in which pressure upon a metallic bellows is created by the tension of the cables or rods pulling on the devices from each end thereof. The force is transmitted by a bell crank and link to compress the bellows and to displace its internal-contained liquid to a balanced actuator. The liquid from the tension-responsive force measuring device on one side enters one end of the balanced actuator or the liquid from the other weighing device enters the opposite end of the actuator. So long as there is no unbalanced load application in the system, the pressures of the liquid on each side of the actuator counterbalance each other. When there is motion and an unbalanced application of load, as for example, when the rudder is being shifted, there is more tension on one cable arm or rod than the other, hence the force measuring device in that cable arm or rod displaces additional liquid into the balanced actuator, thereby creating a shift of its pistons. This results in movement of a crank to which a gear sector is rigidly attached. Angular motion of the gear sector causes rotation, through a multiplying gear, of a spool-type potentiometer, the voltage-output of which is varied from a central null position. The voltage output is transmitted to a meter on the observer's desk or cockpit and the same voltage impulse operates a recorder of the traveling-strip type. The recording and metering circuit is conventional.

Referring now to the accompanying drawings:

Fig. 1 is a schematic representation of the system applied to the rudder of an airplane. The showing is, in general, planwise;

Fig. 2 is a plan view of the weighing or force measuring device, the internal parts, such as the belt crank and link being shown in phantom;

Fig. 3 is a bottom view of a device shown in Fig. 2;

Fig. 4 is a section taken on the line 4—4 of Fig. 2;

Fig. 5 is a top view of a balanced differential pressure-responsive mechanism or actuator;

Fig. 6 is a bottom view of the same differential pressure-responsive mechanism or actuator, showing the exterior of the electrical equipment; and Fig. 7 is a section taken along the line 7—7 of Fig. 6 and shows the hydraulic channels of the actuator and the means for actuating the electrical system.

Referring again to Fig. 1, 10 and 11 are the left and right hand force responsive measuring devices which are connected in the joined cable arms 12 and 13, respectively of an airplane or facsimile thereof, of which 14 is the rudder or some other element of its aero-dynamic structure which is to be controlled by a pilot (not shown) who will operate the combination pedals and cranks 15 or 15a, or other control-initiating devices commonly found on airplanes. 16—16 are pulleys over which the cable arms 12 and 13 are adapted to travel. 17 and 17a are respectively the left hand and right hand hydraulic tubes leading from the force responsive measuring devices 10 and 11 to a balanced actuator 18 which is rigidly mounted on a base plate 61 which is attached to the airplane 19. A crank or lever 20 of the actuator is pivoted at fulcrum 21 and has rigidly attached to its inner end a gear sector 22, also adapted to pivot about the fulcrum 21. Sector 22 engages a pinion 23 which is keyed to a larger multiplying gear 24 which in turn engages a pinion 25 keyed to a spool-type potentiometer 26. 27 are conductors leading from the potentiometer 26 to an indicator 28 which is in view of the test observer and to a recorder 29 which is a conventional element adapted to make a permanent record of the test upon a paper strip.

Referring now to the details of the devices 10 or 11 shown in Figs. 2, 3 and 4, 30 and 31 are strong side plates, one leg or side 32 being slightly longer than the corresponding side or leg 33. A bridge 34 connects the two legs, thereby defining a central oblong opening 35. Two smaller openings 36 and 37, the latter in a bell crank 38 and the former through the side plates, serve for the attachment of cable ends to the device. Opening 37 extends transversely through the bell crank 38 at such a point that the opening 36 will be in line with it and the longitudinal axis of the force responsive device during the greater part of the movement undergone by the bell crank. The bell crank 38 and a spacer 39 at the opposite end of the device are secured between the side plates 30 and 31, the first by pivot 41 and the second by bolts 40. The outer end of the bell crank 38 is flattened so as to engage an adjustable stop 42 which extends through a spacer 43 and which may be locked in desired position by a nut 44. The stop 42 prevents excessive bell crank movement and too great a displacement of hydraulic fluid from the bellows 52.

A pivot or crank pin 45 is provided in the other arm of the bell crank 38 for the purpose of accommodating a link 46, the lower end of which is pivotably attached to a centrally pivoted lever 48 and by a pivot pin 47. The lever 48 is pivoted at its middle point by a pivot 49 extending between the side plates 30 and 31. Its outer end is pivoted by pivot 50 to a lug 51 attached to a hydraulic bellows 52, located in the free space or opening 35. The side plates 30 and 31 are provided with enlarged openings permitting movement of the pivots 45, 47 and 50. In order that bellows 52 may have equally distributed pressure on its ends and to protect them, (see Fig. 4) a lower plate 53 and an upper plate 54 are provided. The lower plate 53 carries the double lug 51 and the upper plate 54 is held by the rear spacer 39 to which it may be welded. 56 is a spacer bar through which and through the plates 30 and 31 extend bolts 57. Upper plate 54 is provided with bosses 58 and 59, the first of these having a threaded opening 60 for the reception of the hydraulic pipe 17.

Tension on the device 10 or 11 between openings 36 and 37 causes the bell crank 38 to pivot on bolt 41, thereby forcing down pivot 45 and link 46. The right hand end of the bellows-actuating lever 48 is thereby depressed, pivoting lever about pivot 49 and compressing the bellows 52. Hydraulic fluid from the bellows is then forced through the pipe 17 or 17a to the balancing actuator 18. The stop 42 will prevent the bell-crank from being actuated to such a degree as to injure the bellows 52.

Referring now to Fig. 5, 61 is a base plate upon which the balancing actuator valve 18 is mounted. Hydraulic manifolds 63 and 62 are attached at the left hand and right hand sides respectively of the base plate 61. These manifolds are also adapted to act as supports for the bellows operating parts. They are, however, not identical with the structural members 19 shown in Fig. 1. Hydraulic access to the manifold 63 is obtained through the opening 64 and access to the right hand manifold 62 is obtained through opening 65. Extending between the manifolds nearest the top plate 94 there is an extensible storage reservoir assembly generally indicated at 74 which comprises a metallic bellows 67 which is in hydraulic communication with the manifold 62. Bolted through this manifold there is a sleeve 68 in which a smooth stem 69 is held stationary. Sleeve 68 is surrounded by a heavy coil spring 70, having a compressive strength greater than the normal load on the system. The outer end of spring 70 abuts a buffer 71 so as to exert sufficient pressure against it to collapse the bellows 67 when the latter is empty. The stem 69 extends through the buffer piece 71 and may be seen in Fig. 7. The bellows 67 is closed at that end which is adjacent the buffer 71 by a wall upon which there is a boss 72 which is adapted to center the bellows in the bore 73 of the buffer 71 and to contact the outer end of the stem 69 when the bellows 67 is fully extended. Hydraulic fluid is supplied to manifold 62 through the tube 17 and opening 65 while tube 17a supplies manifold 63 through opening 64. 66 is a duplicate storage reservoir assembly except that it is a reversal from left to right, of the elements 67, 71, 69, 70 and 68 which make up the storage reservoir assembly 74. Opening 65 serves assembly 74 for access of hydraulic fluid while opening 64 serves the assembly 66.

Fig. 6 presents the base plate 61 in reversed position, since Fig. 6 is a view upward from below while Fig. 5 is a view from above. In Fig. 6 bellows 75, which also appears in Fig. 7, is seen from below and is shown to be mounted between the manifolds 63 and 62. The remainder of the balancing mechanism which is indicated in Fig. 7 by 76 does not appear in Fig. 6 because it is hidden by various mechanical and electrical parts shown in Fig. 7 as follows: 26 is the spool-type potentiometer previously referred to, the electrical connections 78 and 79 and 80 are led to a receptacle 81 into which the conduit 27 is plugged. Actuatably connected to the potentiometer 26, there is the pinion 25, the large multiplying gear 24 meshing with same, the pinion 23 and the gear sector 22 attached to the crank or lever 20. A supporting block 77 is adjustably mounted on the base plate 61 upon which the crank 20 and gear sector 22 are pivoted at 21. By varying the position of the block 77 the lower fulcrum point of the lever 20 can be varied to control the meshing relation between the teeth of sector 22 and the teeth of pinion 23. Likewise a mounting plate 85 is provided for the pinion 23 and the large multiplying gear 24, this plate may also have a slightly variable position to control the degree of mesh between the gear 24 and pinion 25.

The outer end of the crank or lever 20 is pivotally connected at 86 to a spool 87 which is interposed between the hydraulic bellows 75 and a second hydraulic bellows 88. The spool 87 is provided with an upwardly projecting post 89 which can be seen in Fig. 6, and which serves to limit the travel of spool 87 movement of post 89 being limited between two stops 90 and 91, which are attached to a top plate 94. The adjusted position of the block 77 may itself be regulated by a screw adjustment 92 in a block on the base 61 shown in Fig. 6 in engagement with adjustable block 77.

The hydraulic bellows 88 is actuated by hydraulic fluid entering a channel 93 in manifold 62 and through the sleeves 98 and 99 anchored therein from whence departs a channel 94 through the storage reservoir assembly 74 to bellows 67 and a channel 95 to bellows 88. In the manifold 63 there is a hydraulic channel 96 through the sleeve 100 anchored in the manifold from which departs a channel 97 to bellows 75. Hydraulic fluid entering opening 64 flows through the channels 96 and 97 and to the bellows 75 and there attempts to shift the spool 87 to the right. This action is opposed by hydraulic fluid flowing in through the opening 65 into the channel 93 and thence into the channel 95 to fill the bellows 88 and shift the spool 87 to the left. Whichever force is greater will move the spool 87 in its direction in a degree substantially proportional to the differential pressure and shift the lever 20 to rotate the pinion and multiplying gear 24 in a direction contrary to the application of the force. However, pinion 25 in potentiometer 26 will rotate in the same direction as the controlling force.

Should the pressure upon the bellows 52 and device 10 or 11 be so great that danger of rupturing the bellows 75 or 88 would be imminent, the excess from pipe 17 runs through channel 93 into bellows 67 and thereby pushing against the buffer 71. This action overcomes the pressure of the heavy coil spring 70 and expands the bellows 67, thereby providing more space to accommodate the excess fluid. Excess fluid from pipe 17a will run through the hydraulic channel 96 in the manifold 63 and thence through a channel in assembly 66 in Fig. 5 corresponding to the channel 94 in the assembly generally indicated at 74 in Fig. 7, thereby performing the same series of movements and leading to the same results as shown in assembly 74, but in an opposite direction. If the tension on the cable arms 12 and 13 is great enough to force the spool 87 in one direction to such an extent as to force almost all of the hydraulic fluid out of one or the other bellows 75 or 88, fill the corresponding reservoir assembly completely and still exert a high degree of pressure, then the post 89 on spool 87 will come into contact with one of the stops 90 or 91, beyond which it cannot go; therefore the system will lock solidly against one or the other of the stops. Up to that point however, it is evident that the coil spring 70 will follow Hooke's law and will apply a degree of pressure to the excess fluid which is, at a given instant, inversely proportional to the length of the spring.

Between the extremes of contact limits of the post 89 with either stop 90 or 91, the voltage output from the potentiometer 26 through the conventional electric circuit (not shown in detail) will move the hand on the indicator 28 and the needle of the recorder 29 to furnish the desired indications and records indicative of the difference in the tensions exerted on the cable arms 12 or 13. These arms are not meant to be operator-actuated both at one time. Direction of departure of the hand or needle from the middle null point on the indicator or recorder will give the indication as to which arm is being tensioned and the amount of the applied tension.

Occasionally it will be unavoidable that both cable arms 12 and 13 are tensioned by forces beyond the control of the operator. One such a case occurs when thermal expansion of the fuselage takes place due to the heating effect of sunlight or other cause. Both unintended tensions if equal, cancel each other in this system because they oppose each other in the balanced actuator 18. If the forces are unequal, only the difference will be registered on the indicator 28 or recorder 29, because the spool 87 of actuator 18 will be shifted to left or right in proportion to the difference between the forces. The electrical system will, of course, indicate only the shift of the spool 87, not the absolute pressure upon it.

What we claim is:

1. In a force measuring system, a pair of force responsive devices each including a hydraulic bellows and means responsive to cable tension for putting pressure on said bellows to force hydraulic fluid therefrom, a cable attached to each end of said force responsive devices, hydraulic tubes adapted to carry fluid away from said bellows, a hydraulic balanced actuator, connections at each end of said actuator receiving the outer ends of said hydraulic tubes, a central movable spool, hydraulic bellows on each side of said spool, manifolds connected to said bellows for conveying fluid to and from said bellows, a lever pivoted to said spool and to a fulcrum outside the actuator, a potentiometer, means connected to said lever for driving said potentiometer in response to oscillatory movement of said spool and an electric circuit including said potentiometer and a null instrument for indicating the differential magnitude and direction of tension on the force responsive devices as applied by the cable.

2. A system according to claim 1 having in addition a reservoir for the reception of excess hydraulic fluid from said actuator, and spring means on said reservoir for applying a pressure on said excess fluid, which pressure is at any given instant inversely proportional to the length of said spring.

3. In a differential system for measuring the tensional force applied by an operator to one or the other end of a joined cable, a pair of force transmitting devices connected in said cable at corresponding points, said devices including hydraulic bellows and hydraulic fluid within said bellows and means for applying force to said fluid in proportion to the pull exerted on the cable, a balanced hydraulic actuator hydraulically connected between the said devices to receive an equal amount of hydraulic fluid from each of said devices when the tension upon them is equal, a spool included in said actuator, the position of which is laterally shiftable in response to the excess of fluid entering one side of the actuator over that which is contained in the other side, lever means attached to said spool, said means being rockable by the displacement thereof, a potentiometer, driving means for said potentiometer, said means being actuable by the rocking motion of said lever, and indicating means showing the extent and direction of the driven motion of said potentiometer.

4. In a force responsive device adapted to indicate cable tension, a dual substantially U-shaped frame having a substantially central crosswise opening and an end crosswise opening, a bell crank pivoted at the end of one leg thereof, said bell crank having an opening for the connection of a cable thereto, a first pivoted link extending athwart said frame in operative contact with said bell crank, a lever pivoted at substantially its mid point and extending along a leg of said frame a pivot joining the first link and the lever at one end, a hydraulic bellows mounted within said opening and adapted to be engaged and compressed endwise by a free end of said lever upon the cable being subjected to tension through said opening in said bell crank, and a hydraulic tube positioned with its end substantially in said frame in fluid communication with said bellows to receive hydraulic fluid therefrom when the bellows is heavily compressed, all of said parts except substantially said bellows and said pivots being mounted substantially within said frame.

5. A hydraulic actuator responsive to differential pressure comprising the combination of a pair of spaced manifolds, hydraulic tubes connected to said manifolds, a pair of sleeves, each sleeve being connected to a respective manifold to project inwardly in axial alignment with the other sleeve, a hydraulic bellows attached to the inner end of each sleeve and in fluid communication with the interior thereof, a spool between the bellows and attached to each of them, a lever pivoted by its outer end to said spool, its inner end being pivoted at a point spaced from said spool, a gear sector attached to the inner end of said lever, a gear train driven by said sector and a potentiometer driven by said gear train.

WILLIAM W. WOOD, Jr.
LESTER E. LUNDQUIST, Jr.

References Cited in the file of this patent

UNITED STATES PATENTS

| Number | Name | Date |
| --- | --- | --- |
| 1,417,462 | Eason | May 23, 1922 |
| 1,543,061 | Danielson | June 23, 1925 |
| 1,568,140 | Edge et al. | Jan. 5, 1926 |
| 1,783,251 | Marr et al. | Dec. 2, 1930 |
| 1,949,908 | Hawk | Mar. 6, 1934 |
| 2,235,279 | Bunker | Mar. 18, 1941 |
| 2,505,070 | Shaw | Apr. 25, 1950 |